(No Model.)
D. C. STOVER.
Corn Sheller.
No. 240,052. Patented April 12, 1881.
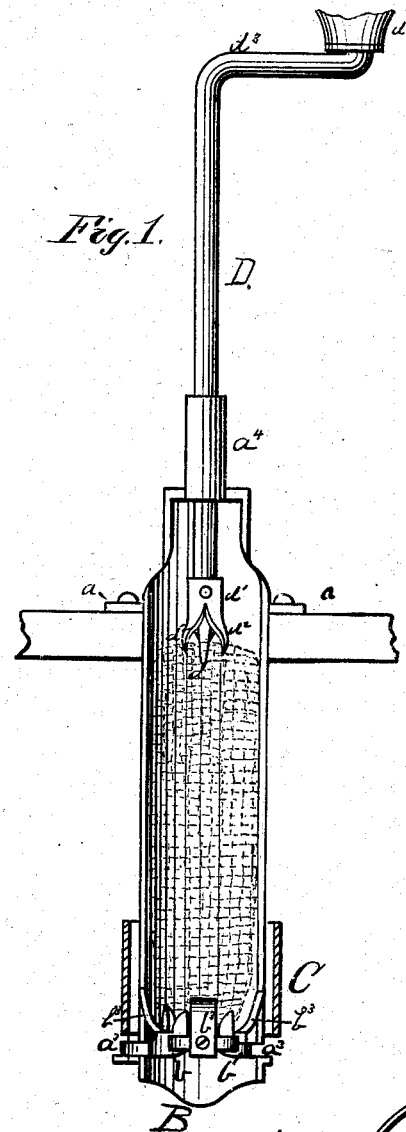
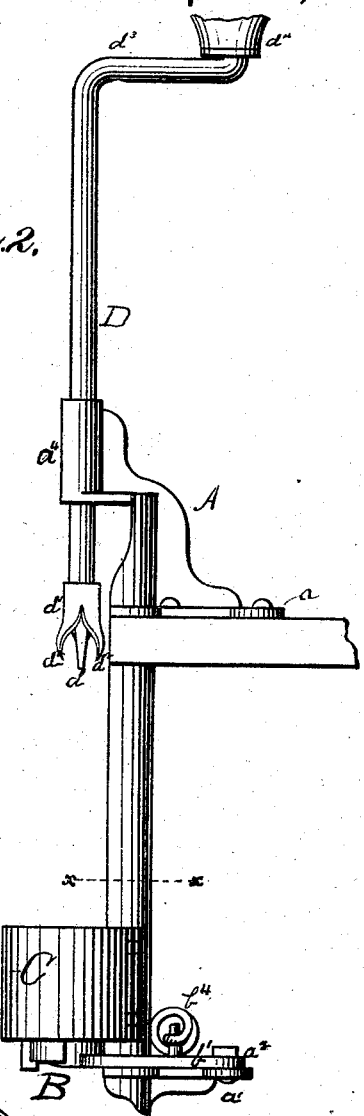
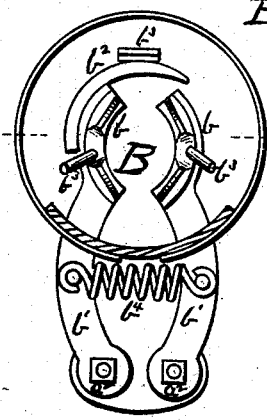
Witnesses,
Henry Frankfurter
Pliny B. Smith
Inventor,
Daniel C. Stover
per Dixon & Smith
Attorneys.
N. PETERS, PHOTO-LITHOGRAPHER, WASHINGTON, D. C.

UNITED STATES PATENT OFFICE.

DANIEL C. STOVER, OF FREEPORT, ILLINOIS, ASSIGNOR TO LEVI M. DEVORE, OF SAME PLACE.

CORN-SHELLER.

SPECIFICATION forming part of Letters Patent No. 240,052, dated April 12, 1881.

Application filed December 16, 1880. (No model.)

*To all whom it may concern:*

Be it known that I, DANIEL C. STOVER, of the city of Freeport, county of Stephenson, and State of Illinois, have invented a new and useful Improvement in Hand Corn-Shellers, of which the following is a description, reference being had to the accompanying drawings, in which—

Figure 1 represents a front view of a corn-sheller embodying my improvement with a portion of the sheath broken off to show the interior construction. Fig. 2 represents a side view of the same; and Fig. 3 a sectional plan view of the lower portion, taken on the line $x$ $x$, Fig. 1.

The object of my invention is to furnish a simple, cheap, and effective corn-sheller which can be operated by hand and shell the corn rapidly and thoroughly and with great ease.

Heretofore hand corn-shellers have been made consisting of a circular sheller-head provided with a handle, which the operator, grasping in one hand, turned around on the ear of corn held in the other hand until the ear was partly shelled, when the operator grasped the cob at the other end and continued the operation till the shelling was complete. In others the sheller-head is stationary, and the ear is grasped and turned by hand. But these devices, though simple and cheap, are crude, awkward, and slow in operation and tiresome, because of the strain upon the hands.

My invention consists not only in providing a sheller-head, but also, in combination, a claw-head, which, engaging fixedly in the butt-end of the ear of corn, forces it through the sheller-head as the corn is removed from the cob, and without contact of the hand with the ear, after it is placed in the sheller.

It also consists in a frame provided with a lug whereby it is fastened to a suitable support, and fitted at one end with a sheller-head and at the other end with a bearing through which passes a rod fitted upon its inner end with a claw-head, for the purpose of engaging in the butt-end of an ear of corn, and with its outer end bent in the form of a crank with a suitable handle thereon; also, in a concave back above the sheller-head, for the purpose of supporting and partially inclosing the ear of corn; also, in a back provided with a lug in the rear, to which the jaws forming the sheller-head are pivoted, and in a sheath for the purpose of inclosing the ear of corn in front, above the sheller-head, all of which will be hereinafter more particularly described, and pointed out definitely in the claims.

In the drawings, A represents the frame or support, provided at its rear with one or more lugs, $a$, which may be attached by screws or otherwise to any suitable support. It is also provided at its lower end, at its rear, with the lug $a'$, to the face of which are pivoted at $a^2$, one upon each side, the arms $b'$, which pass through notches $a^3$ in the lower edge of the support A, and terminate in front in the curved jaws $b\ b$, which form the sheller-head B. The jaws $b\ b$ are provided with sharp projections or teeth extending above in the usual manner, and are united in the rear of the support A by the coiled spring $b^4$. One or both of the jaws $b$ are provided with the curved projection $b^2$, partially encompassing the extremity of the other jaw, and when two projections are employed one extends in front and the other in the rear of the jaws.

Attached to the projection $b^2$ is the upwardly and outwardly curving finger $b^3$, and similar fingers $b^3$ are also attached to the jaws $b\ b$, as guides for the small end of the ear of corn.

Attached to the lower end of the support A is the sheath C, preferably made of sheet-iron, extending around in front and a short distance above the sheller-head B, for the purpose of partially inclosing the ear of corn, and also of gathering into a stream below the shelled corn.

The support A, as it extends upward, is concave in form in front, so as to partially inclose and support the ear of corn. At its upper end it is provided in front with the long bearing $a^4$, into which is fitted loosely the rod D, terminating at its inner end in a sharp spike, $d$, around which is fastened the claw-head $d'$, with the sharp claws $d^2$, preferably bent slightly outward and forward in one direction around the circumference, and with the spike $d$ extending half an inch, more or less, beyond them. The other end of the rod D extends outward from the bearing $a^4$ to a sufficient length to permit the claw-head $d'$ to descend to the sheller-head B, and is then bent into a short crank, $d^3$, and provided with a suitable handle, $d^4$. The frame or support A is preferably formed of iron cast in a single piece.

In the operation of my improvement the frame A is attached rigidly to a suitable support, preferably in a perpendicular position with the handle upward, and, if preferred, the lower lug, $a'$, may also be attached to the same support as the lug $a$, or screws may be inserted directly through the back of the frame A. The rod D is now elevated a sufficient distance, and an ear of corn is placed in front of the concave frame A, with its tip or small end within the guides $b^3$ of the sheller-head B. The rod D is now lowered and the spike $d$ pressed into the butt-end of the cob until the claws $d^2$ of the claw-head $d'$ engage into the end of the ear, when the crank is turned, with pressure, downward, causing the ear of corn to revolve, and descends as fast as the sheller-head B removes the corn from the cob, until the latter passes through and falls below, when the rod D is drawn upward and the operation repeated as before.

This sheller is capable of very rapid work, operates easily, and shells the corn thoroughly, comparing favorably in every respect in its results with the much more expensive and cumbersome rotary-disk hand corn-shellers.

It is obvious that my invention is capable of a variety of modifications in its structure, a few of which I will point out. Thus the rod D may be attached rigidly at its outer end to a suitable support, and a crank and handle attached to the other end of the frame A, when the ear of corn would be held stationary upon the claw-head $d'$, and the revolution of the frame A and the sheller-head B would remove the corn from the ear; or, the claw-head $d'$ may be attached rigidly to one end of the frame A and a circular sheller-head to the inner end of a rod similar to the rod D, when the revolution of the latter would produce similar result; or, springs may be applied which shall force the sheller-head and the claw-head toward each other, or one toward the other, or any appropriate form of sheller-head, or any appropriate form of attachment as a substitute for the claw-head may be applied; or, the rod D may be formed into a coarse screw, so as to be forced downward as it is revolved, with its bearing opening so as to permit it to slide backward quickly.

Having thus described my invention, what I claim as new, and desire to secure by Letters Patent, is—

1. A hand corn-sheller provided with a claw-head having sharp prongs projecting at their points slightly forward around the circumference of the claw-head for the purpose of engaging in the butt-end of an ear of corn, in combination with a sheller-head and supporting-frame, substantially as described.

2. In a corn-sheller, the claw-head $d'$, having the interior spike, $d$, and provided with sharp projecting claws or prongs curved at their points slightly forward around the circumference of the claw-head, in combination with a sheller-head and a supporting-frame, substantially as and for the purpose set forth.

3. In a corn-sheller, the combination of a claw-head, a sheller-head, and a supporting-frame concave above the sheller-head for the reception and retention of an ear of corn, substantially as described.

4. In a corn-sheller, the combination of a claw-head, a sheller-head, and a supporting-frame concave above the sheller-head, and provided with a sheath, forming, with the concave frame, an entire inclosure for the ear of corn adjacent to the sheller-head, for the purpose of preventing the kernels of corn from scattering and to direct them below, substantially as described.

DANIEL C. STOVER.

Witnesses:
H. M. BARNUM,
L. M. DEVORE.